United States Patent Office 3,000,847
Patented Sept. 19, 1961

3,000,847
SYNTHETIC RUBBER CURE USING A TETRA-METHYLOL BIS-PHENOL AND PRODUCT THEREOF
Galen E. Graham, East Hempfield Township, Lancaster County, Pa., assignor to Armstrong Cork Company, Lancaster, Pa., a corporation of Pennsylvania
No Drawing. Filed May 28, 1958, Ser. No. 738,321
19 Claims. (Cl. 260—41.5)

This invention relates generally to the curing of rubber and more particularly to the curing of synthetic rubbers by means of a particular class of curing agents. Still more particularly the invention relates to the curing of synthetic rubbers whereby the resulting cured product possesses the high tensile strength obtainable by prior art curing systems but which possess enhanced elongation and resiliency over anything obtained in the prior art. The invention also relates to the resulting cured synthetic rubber.

It is known to cure various synthetic rubbers with dimethylol phenols. U.S. Patents Nos. 2,649,431 and 2,649,432, issued August 18, 1953, describe vulcanization procedures wherein certain dimethylol mononuclear phenols are used as vulcanizing agents for a variety of synthetic rubbers. Similarly, U.S. Patents 2,701,895; 2,702,287; and 2,726,224 all teach the cure of butyl rubber with dimethylol phenols; these patents also contain improvements in the art of curing butyl rubber with the dimethylol phenols alone.

Despite the excellence of the curing systems taught in the above-described patents, particularly as applied to butyl rubber, there is a need for a curing or vulcanizing system which will produce a cured rubber product having enhanced properties not obtainable by the patented processes.

It is the primary object of the present invention to supply such rubbers. It is a further object of the present invention to present a method of curing synthetic rubbers rapidly and efficiently to produce useful products.

These objects are accomplished in a surprisingly effective and straightforward manner. The invention contemplates admixing each 100 parts by weight of a synthetic rubber with 2–18 parts by weight of a compound having the formula

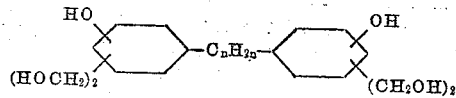

where $n$ is a number from 1–5, inclusive. The resulting mixture is then heated to a temperature in the range of about 200°–400° F. to cure the rubber.

The synthetic rubbers which may be cured by the curing agents of the present invention include a wide variety of synthetic rubbers such as the products known as GR–S (SBR) which is a copolymer of butadiene and styrene containing about 50% to about 70% butadiene. There may also be used the Buna N's (NBR) which are copolymers of butadiene and acrylonitrile containing about 50% to about 80% butadiene. Generally speaking, these rubbers may be defined as polymers of aliphatic, conjugated diolefins and copolymers of aliphatic, conjugated diolefins with other copolymerizable monomeric compounds. Thus homopolymers of butadiene (BR) may be employed as well as homopolymers and/or copolymers of butadiene homologues such as isoprene. Neoprene (CR) may be used; neoprene is a polymer of 2-chlorobutadiene-1,3, generally referred to as chloroprene. Butyl rubbers (IIR) lend themselves to cures by the compounds of the present invention. Butyl rubber is the type of synthetic rubber made by copolymerizing as iso-olefin, usually isobutylene, with a minor proportion of a multi-olefinic unsaturate having from 4–14 carbon atoms per molecule.

The iso-olefins used generally have from 4–7 carbon atoms, and such isomono-olefins as isobutylene or ethyl methyl ethylene are preferred. The multi-olefinic unsaturate usually is an aliphatic conjugated diolefin having from 4–6 carbon atoms, and is preferably isoprene or butadiene. Other suitable diolefins that may be mentioned are such compounds as piperylene; 2,3-dimethyl butadiene-1,3; 1-dimethyl butadiene-1,3; 1,3-dimethyl butadiene-1,3; 1,3-ethyl butadiene-1,3; and 1,4-dimethyl butadiene-1,3. The butyl rubber contains only relatively small amounts of copolymerized diene, typically from about 0.5–5%, and seldom more than 10%, on the total weight of the synthetic rubber.

The curing agents of the present invention to be added to the synthetic rubbers are all the reaction products of formaldehyde and a bis-phenol; they will be the tetramethylol derivative of a bis-phenol. Analysis sometimes indicates the presence of less than 4 methylol groups per molecule, but this probably merely means that some unreacted bis-phenol is present. Examples of the bis-phenols which are to be reacted with the formaldehyde are bis-(4-hydroxy-phenyl) methane; bis-(2-hydroxy-phenyl) methane; bis-(4-hydroxy, 2-methyl-phenyl) methane; 2,2-bis-(4-hydroxy-phenyl) propane; 2,2-bis-(2, 4'-dihydroxy-diphenyl) propane; 2,2-bis-(2-hydroxy-phenyl) propane; 2,2-bis-(4-hydroxy, 2-methyl-phenyl) butane; and 2,2-bis-(2,4-dihydroxy-phenyl) pentane.

The reaction of the bis-phenol with formaldehyde is carried out in the presence of a strong alkaline catalyst, especially an alkali metal hydroxide, which is subsequently neutralized. Sufficient formaldehyde is reacted with the bis-phenol to form the tetra-methylol compound. Thus the mole ratio of formaldehyde to bis-phenol will be slightly in excess of 4:1. Reaction is usually carried out in an aqueous medium. The mixture of the bis-phenol, formaldehyde, and alkaline catalyst is maintained at a suitably low temperature, for example, 25°–40° C. to preserve the tetra-methylol reaction product in the form of a monomer. Temperatures higher than about 40° C. will produce some polymer which reduces the activity of the compounds. The tetra-methylol bis-phenols can be isolated by acidification of the reaction mixture and separation of the solids or the oily layer. Water may be stripped from the mixture by warming under vacuum. In view of the low temperatures of reaction necessary to prepare the tetra-methylol compounds useful in the present invention, the period of time during which the reaction is carried out must be sufficiently long to substantially completely consume all the formaldehyde. Depending on the precise temperature within the limits stated above, reaction time may vary from two hours to several days.

The final tetra-methylol bis-phenol will generally initially be prepared in the form of an oil. This oil, however, is readily converted to a solid by removing any free formaldehyde from the system chemically or by thorough washing. It has been found in practice that once the oily product has been converted to a solid, subsequent runs in the same equipment produce the tetra-methylol bis-phenols as solid products more readily. This is apparently due at least in part to fortuitous seeding of the product; such seeding occurs even after the equipment has been thoroughly cleaned.

The tetra-methylol bis-phenol is used in amounts of about 1 to 18 parts by weight to 100 parts by weight of the butyl rubber.

There will generally be added catalytic amounts of substances to speed the reaction between the rubber and the tetra-methylol bis-phenol. The catalysts will generally be acidic in nature. Organic acids such as acetic acid and benzoic acid may be used. Additionally, the organic sulfonic acids such as para-toluene sulfonic acid, phenol-hydrazine sulfonic acid, and ethane sulfonic acid are all suitable for shortening the cure time. Another class of compounds suitable for accelerating the reaction between the rubbers and the tetra-methylol bis-phenol are the heavy metal halides as set forth in aforesaid U.S. Patent 2,726,224. Examples of the stable acidic halides are tin chlorides, zinc chloride, iron chlorides, and in general the halides of the various metals usually classified as heavy metals, including the chlorides of aluminum, chromium, nickel, cobalt, manganese, and copper. The accelerators are used in amounts of about 0.2–5 parts by weight accelerator per 100 parts by weight rubber.

The mixing of the ingredients is carried out by known methods. The rubber, the tetra-methylol bis-phenol, the accelerator, and any additional desired ingredients may be mixed together in any desired order according to the procedures ordinarily used in mixing rubber compounds with the aid of the usual rubber-mixing equipment such as an internal mixer or roll mills. For many purposes there will generally be included in the mixture a quantity of a suitable reinforcing material, preferably carbon black. The amount of carbon black to be used will vary according to the properties of the finished product desired, but there will generally be used 20–100 parts by weight carbon black per 100 parts by weight rubber, and more preferably 40–80 parts black, and most preferably 50–60 parts by weight black per 100 parts rubber. Other compounding ingredients such as additional fillers, processing aids, and the like may be included in the mixture if desired. Some compositions such as rubber tile for flooring may contain a mixture of mineral fillers, including both fibrous and nonfibrous fillers, additional resins to impart special properties, certain plasticizers, and pigments to impart the desired color.

The curing processes to be applied to the composition of the present invention are those generally used curing processes known in the rubber art. The temperatures to be used will be those in excess of 200° F. and preferably in excess of 300° F. for periods of time ranging from five minutes to three hours, the longer periods of time within the stated time range being employed with the lower temperatures. The broad temperature range will be 200°–400° F. while the preferred vulcanizing temperatures are within the range of about 320° F. to 370° F. Temperatures near the upper limits should not be employed for a sufficiently long time to cause thermal injury to the article being cured.

Initial cure of butyl rubbers with the curing agents of the present invention will produce vulcanized rubber having fair tensile strength and good elongation. However, on aging the vulcanized butyl rubber products, for example, aging for one week at a temperature of about 300° F., the tensile strengths of the products will greatly improve while maintaining the excellent elongation. The final product will thus possess tensile strengths comparable to those achieved by the prior art, but with greatly improved elongation.

The vulcanizable mixture resulting from the admixing of the above-described ingredients may be fabricated into the desired form by the usual methods such as calendering, extrusion, or molding and subsequently vulcanized by heating preferably while confined under pressure. Use of the tetra-methylol bis-phenol compounds in the rubber compositions as contrasted with use of the dimethylol phenols of the prior art will allow preparation of the composition without as much danger of scorching during the mixing steps on a mill or internal mixer.

The following examples illustrate several embodiments of the invention. All parts are by weight unless otherwise stated.

*Example I*

Into a stainless steel container containing 800 parts of 10% aqueous sodium hydroxide solution (2 mols NaOH) was introduced 228 parts (1 mol) 2,2-bis-(4-hydroxyphenyl) propane. The temperature rose to 30°–35° C. After cooling to room temperature (about 28° C.), there was added 330 parts (4.4 mols) 40% solution of formaldehyde. The mixture was allowed to stand at room temperature for 24 hours.

At the end of that period, the mixture was acidified with a 30% solution of acetic acid to a pH of 6. The bottom oily layer was separated and washed thoroughly with water. The tetra-methylol derivative of 2,2-bis-(4-hydroxy-phenyl) propane crystallized to form a creamy white solid. This 2,2-bis-(3,5-dimethylol, 4-hydroxyphenyl) propane was used in the examples below where indicated under the name "tetra-methylol bis-phenol."

*Example II*

A master batch was prepared of relative proportions of 100 parts of a butyl rubber designated as "Butyl 365," 50 parts of HAF carbon black (Philblack O), 1 part stearic acid, and 3 parts stannous chloride. Mixing was carried out on a mill in the usual manner.

Of the master batch 154 parts were blended on a mill with 7.5 parts of the tetra-methylol bis-phenol prepared as described in Example I. After thorough dispersion of the tetra-methylol compound, the mixture was sheeted off the mill and press cured at 320° F. Different specimens were cured for different lengths of time. Following are the results:

| Minutes of Cure | Tensile Strength, Lbs./sq. in. | Hardness, Shore A | Elongation, Percent |
|---|---|---|---|
| 20 | 1,252 | 62 | 420 |
| 40 | 1,530 | 62 | 370 |
| 60 | 1,595 | 66 | 340 |

No difficulty with scorching was encountered in preparation of the master batch or the final mix.

The above specimens were aged for one week in an air-circulating oven maintained at 300° F. Following are the results:

| Minutes of Initial Cure | Tensile Strength | Hardness, Shore A | Elongation, Percent |
|---|---|---|---|
| 20 | 1,350 | 67 | 270 |
| 40 | 1,450 | 67 | 290 |
| 60 | 1,460 | 66 | 290 |

When 154 parts of the master batch was admixed with 7.5 parts of a compound which is a dimethylol phenol instead of a tetra-methylol bis-phenol, tensile strengths of the cured final product were slightly higher than those given above before aging, but the Shore A hardness was slightly lower. Additionally, the mixture tended to scorch on the mill.

*Example III*

A rubber tile formulation was prepared by the usual mixing technics. Following is the formula:

| Ingredients: | Parts |
|---|---|
| Butadiene-styrene copolymer, 23½% styrene (GR-S 1006) | 90 |
| Asbestos | 15 |
| Coumarone-indene resin | 7 |
| Burgundy pitch (hydrocarbons still bottoms) | 3 |
| Polyethylene glycol (molecular weight, 400; Carbowax 400) | 1.5 |
| Light hydrocarbon oil, primarily aliphatic | 11.7 |
| Calcium carbonate, whiting | 75 |
| Hard clay (Suprex Clay) | 95 |
| Medium clay | 75 |
| Pigment, 30% TiO$_2$, 70% CaSO$_4$ | 107 |
| Ultramarine Blue | 0.93 |
| Tetra-methylol bis-phenol | 8 |
| Stannous chloride | 3 |

The tile was sheeted out to 0.125" in thickness and press cured for nine minutes at a temperature of 327° F. An excellent tile resulted.

The above formula is substantially identical to that used in rubber tile formula save that the tetra-methylol bis-phenol compound has been substituted for the conventional curing system of sulfur, zinc oxide, magnesium oxide, and accelerator. The curing of the tile with the tetra-methylol bis-phenol compound produced a whiter tile than was possible with a composition containing a sulfur curing system.

When the above formula was repeated using a dimethylol phenol instead of the tetra-methylol bis-phenol, no substantial cure resulted. Three separate compositions were prepared containing, respectively, (1) 2,6-dimethylol, 4-octyl phenol (Amberol ST-137), (2) a dimethylol phenol resin (Catalin 9273), and (3) a dimethyl phenol resin (Schenectady SP-1045). The resulting products were unsuitable as floor coverings since they had insufficient cure.

*Example IV*

The following composition was prepared:

Ingredients: Parts
Butadiene-styrene copolymer (GR-S 1502) _____ 100
Oil-soluble sulphonic acids in paraffin oil (Reogen, peptizing agent) _____ 5
Carbon black (P-33) _____ 30
Channel black (EPC) _____ 15
Process oil (light) _____ 5
Tetra-methylol bis-phenol _____ 7.5
Stannous chloride _____ 3
Stearic acid _____ 1

The copolymer, peptizing agent, channel black, tetra-methylol bis-phenol, and stearic acid were admixed on a mill and heated to a temperature in the range of 225°–235° F. until thorough mixing was accomplished. The mix was then cooled and there was added the P-33 black, the process oil, and the stannous chloride on the cold mill until thorough mixing was accomplished. The mixture was then sheeted off and cured at 300° F. for 20 minutes in a press. An excellent, strong, flexible rubber sheet resulted.

When the example was repeated using natural rubber instead of the butadiene-styrene copolymer, no substantial cure resulted.

*Example V*

The following formulation was mixed similarly to Example IV:

Ingredients: Parts
Butadiene-acrylonitrile copolymer, 33% acrylonitrile (Hycar 1042) _____ 100
Stearic acid _____ 1
Carbon black (P-33) _____ 30
Channel black (EPC) _____ 15
Dibutyl phthalate _____ 12
Cumar-indene resin (MH 2½) _____ 12
Tetra-methylol bis-phenol _____ 7.5
Stannous chloride _____ 3

Some slight curing was noted on the mill. The mixture was sheeted off and cured for 20 minutes at 320° F. A strong, flexible rubber sheet resulted.

*Example VI*

The following mixture was cold mixed on a cold mill:

Ingredients: Parts
Polychloroprene (Neoprene W) _____ 100
Carbon black (P-33) _____ 30
Channel black (EPC) _____ 15
Light oil _____ 8
Tetra-methylol bis-phenol _____ 7.5
Stannous chloride _____ 3

The resulting sheet was cured for 20 minutes at 320° F. producing a strong, tough, flexible rubber sheet.

*Example VII*

The following ingredients were mixed on a mill:

Ingredients: Parts
Chlorosulfonated polyethylene (Hypalon 20) _____ 100
Channel black (EPC) _____ 15
Carbon black (P-33) _____ 30
Light oil _____ 8
Tetra-methylol bis-phenol _____ 7.5
Stannous chloride _____ 3

The mixture was sheeted off the mill and cured for 20 minutes at 320° F. A strong, tough, flexible rubber product resulted.

*Example VIII*

The following ingredients were mill mixed:

Ingredients: Parts
Butyl rubber (Butyl 365) _____ 100
Philblack O _____ 50
Stearic acid _____ 1.0
Tetra-methylol-bis-(4-hydroxyl-phenyl) methane _____ 7.5
Stannous chloride _____ 2.0

The mixture was sheeted off the mill and cured for 20 minutes at 320° F.

A strong, tough, flexible rubber product resulted.

I claim:

1. The method of curing a synthetic rubber selected from the group consisting of butadiene-styrene copolymers, butadiene-acrylonitrile copolymers, copolymers of isobutylene with a minor proportion of a multi-olefinic unsaturate having from 4–14 carbon atoms per molecule; polychloroprene, and chlorosulfonated polyethylene which comprises admixing with each 100 parts by weight of said synthetic rubber 2–18 parts by weight of a compound having the formula

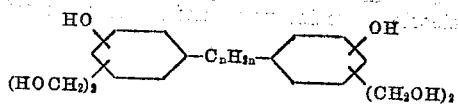

where $n$ is a number from 1–5, inclusive, and heating the mixture to a temperature in the range of 200°–400° F. to cure the rubber.

2. The method according to claim 1 wherein said compound is present in an amount of about 7–8 parts by weight per 100 parts by weight of said rubber.

3. The method according to claim 1 wherein $n$ is 3.

4. The method according to claim 1 wherein $n$ is 1.

5. The method according to claim 1 wherein said heating is carried out at a temperature of about 320° F.

6. The method according to claim 1 including the step of incorporating carbon black into said mixture.

7. The method according to claim 1 wherein said synthetic rubber comprises a butadiene-styrene copolymer.

8. The method according to claim 1 wherein said synthetic rubber comprises a butadiene-acrylonitrile copolymer.

9. The method according to claim 1 wherein said synthetic rubber comprises a copolymer of isobutylene with a minor proportion of a multi-olefinic unsaturate having from 4–14 carbon atoms per molecule.

10. The method according to claim 1 wherein said synthetic rubber comprises a polychloroprene.

11. The method according to claim 1 wherein said synthetic rubber comprises a chlorosulfonated polyethylene.

12. The method according to claim 1 wherein an organic acidic catalyst is admixed with said rubber and said compound.

13. A vulcanizable composition of matter comprising relative proportions of 100 parts by weight synthetic rubber selected from the group consisting of butadiene-styrene copolymers, butadiene-acrylonitrile copolymers, copolymers of isobutylene with a minor proportion of a multi-olefinic unsaturate having from 4–14 carbon atoms per molecule, polychloroprene, and chlorosulfonated polyethylene and 2–18 parts by weight of a compound having the formula

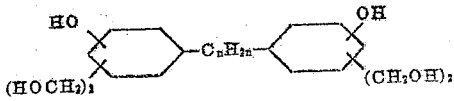

wherein *n* is a number from 1–5, inclusive.

14. An elastic vulcanizate comprising a synthetic rubber selected from the group consisting of butadiene-styrene copolymers, butadiene-acrylonitrile copolymers, copolymers of isobutylene with a minor proportion of a multi-olefinic unsaturate having from 4–14 carbon atoms per molecule, polychloroprene, and chlorosulfonated polyethylene vulcanized with from 2–18 parts by weight per 100 parts by weight of said rubber of a compound having the formula

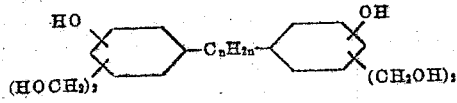

where *n* is a number from 1–5, inclusive.

15. A vulcanizate according to claim 14 containing carbon black.

16. A vulcanizate according to claim 14 containing 7–8 parts by weight of said compound per 100 parts by weight of said synthetic rubber.

17. A vulcanizate according to claim 14 wherein *n* equals 3.

18. The method of forming a rubber flooring composition which comprises admixing a synthetic rubber selected from the group consisting of butadiene-styrene copolymers, butadiene-acrylonitrile copolymers, copolymers of isobutylene with a minor proportion of a multi-olefinic unsaturate having from 4–14 carbon atoms per molecule, polychloroprene, and chlorosulfonated polyethylene, mineral fillers therefor, and pigments, incorporating into the mixture about 2–18 parts by weight per 100 parts by weight of said synthetic rubber of a compound having the formula

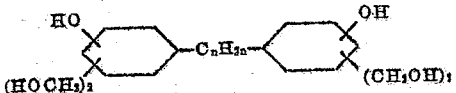

wherein *n* is a number from 1–5, inclusive, forming a sheet from the resulting mixture, and curing said sheet at a temperature in the range of about 200°–400° F.

19. A vulcanized rubber flooring composition comprising a synthetic rubber selected from the group consisting of butadiene-styrene copolymers, butadiene-acrylonitrile copolymers, copolymers of isobutylene with a minor proportion of a multi-olefinic unsaturate having from 4–14 carbon atoms per molecule, polychloroprene, and chlorosulfonated polyethylene and mineral fillers therefor, vulcanized with from 2–18 parts by weight per 100 parts by weight of said rubber of a compound having the formula

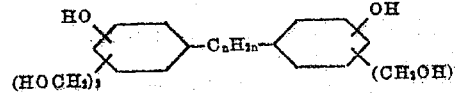

wherein *n* is a number from 1–5, inclusive.

References Cited in the file of this patent

UNITED STATES PATENTS

| | | |
|---|---|---|
| 2,649,431 | Little | Aug. 18, 1953 |
| 2,649,432 | Little | Aug. 18, 1953 |
| 2,701,895 | Tawney et al. | Feb. 15, 1955 |
| 2,702,287 | Iknayan | Feb. 15, 1955 |
| 2,726,224 | Peterson et al. | Dec. 6, 1955 |

OTHER REFERENCES

Carswell: "Phenoplasts," page 10, 1947, Interscience Publishers, Inc., New York.